United States Patent
McKaig

(10) Patent No.: US 8,950,642 B2
(45) Date of Patent: Feb. 10, 2015

(54) MULTI-POSITION BEVERAGE CONTAINER CARRIER FOR BICYCLES

(76) Inventor: Sheila Derith McKaig, Pacific Grove, CA (US)

( * ) Notice: Subject to any disclaimer, the term of this patent is extended or adjusted under 35 U.S.C. 154(b) by 296 days.

(21) Appl. No.: 12/835,711

(22) Filed: Jul. 13, 2010

(65) Prior Publication Data

US 2012/0012626 A1   Jan. 19, 2012

(51) Int. Cl.
*B62J 11/00* (2006.01)

(52) U.S. Cl.
CPC .............. *B62J 11/00* (2013.01); *Y10S 224/926* (2013.01)
USPC ........... 224/414; 224/425; 224/443; 224/282; 224/926

(58) Field of Classification Search
USPC ......... 224/414, 443, 425, 282, 926, 548, 549, 224/553; 248/311.2; D12/411
See application file for complete search history.

(56) References Cited

U.S. PATENT DOCUMENTS

| | | |
|---|---|---|
| 713,160 A | 11/1902 | Schneider |
| 1,142,729 A | 6/1915 | Rathjen |
| 1,386,302 A | 8/1921 | Brant |
| 4,009,810 A | 3/1977 | Shook |
| 4,256,281 A | 3/1981 | Harris et al. |
| 4,339,060 A * | 7/1982 | Braida, Jr. ..................... 224/428 |
| 4,819,843 A | 4/1989 | Nakayama |
| 5,085,390 A | 2/1992 | Murphy |
| 5,289,962 A | 3/1994 | Tull et al. |
| D367,998 S | 3/1996 | Graw et al. |
| 5,839,632 A | 11/1998 | Koday |
| 6,047,937 A * | 4/2000 | Huang ........................ 248/311.2 |
| 6,655,563 B2 | 12/2003 | Shimajiri |
| 6,808,149 B1 | 10/2004 | Sendowski et al. |
| RE39,392 E | 11/2006 | Bergin |
| 7,172,102 B2 | 2/2007 | Lewien et al. |
| 2007/0138225 A1 | 6/2007 | Duchesne |

* cited by examiner

*Primary Examiner* — Justin Larson
(74) *Attorney, Agent, or Firm* — Belair Intellectual Property Law LLC

(57) ABSTRACT

A multi-position beverage container carrier including a mount (302) adaptable for mounting on a down tube (106) of a bicycle (102), the mount having a hub (310) disposed substantially near the lower end the mount; and a carriage (300) extending from the hub, wherein the carriage is movable from a first position substantially adjacent to the down tube to a second position located substantially vertical in a plane formed by the seat post and the down tube.

20 Claims, 4 Drawing Sheets

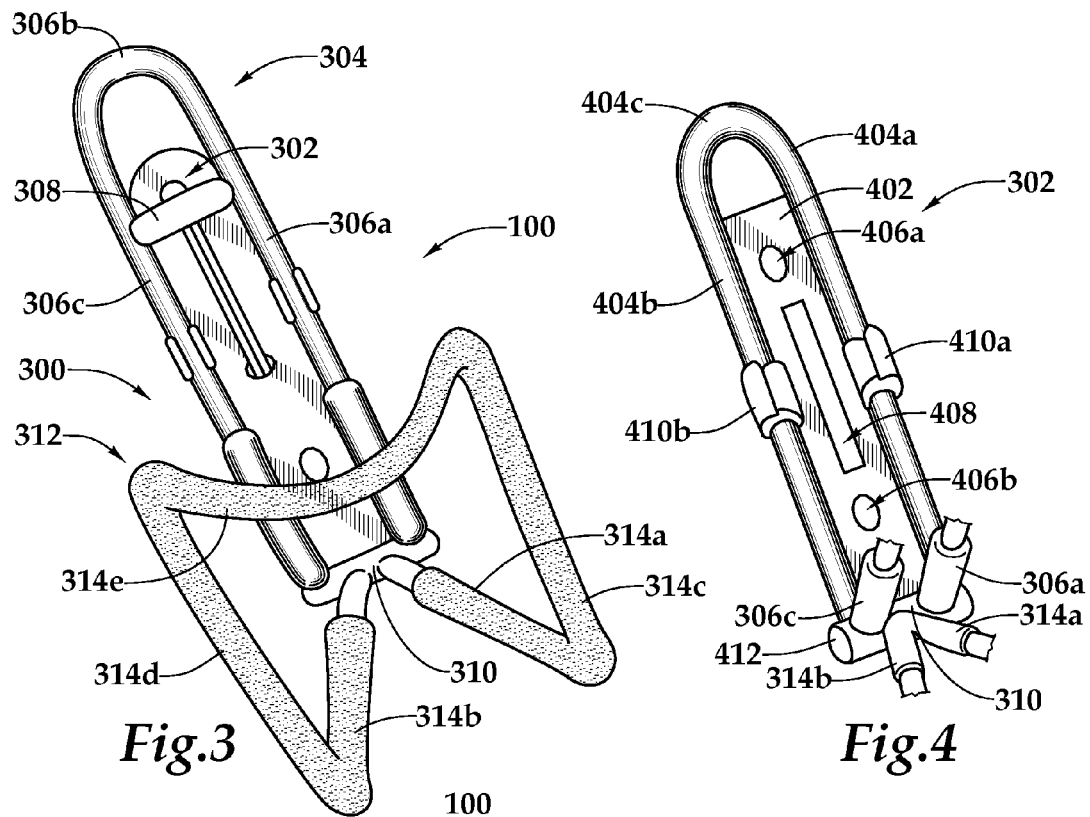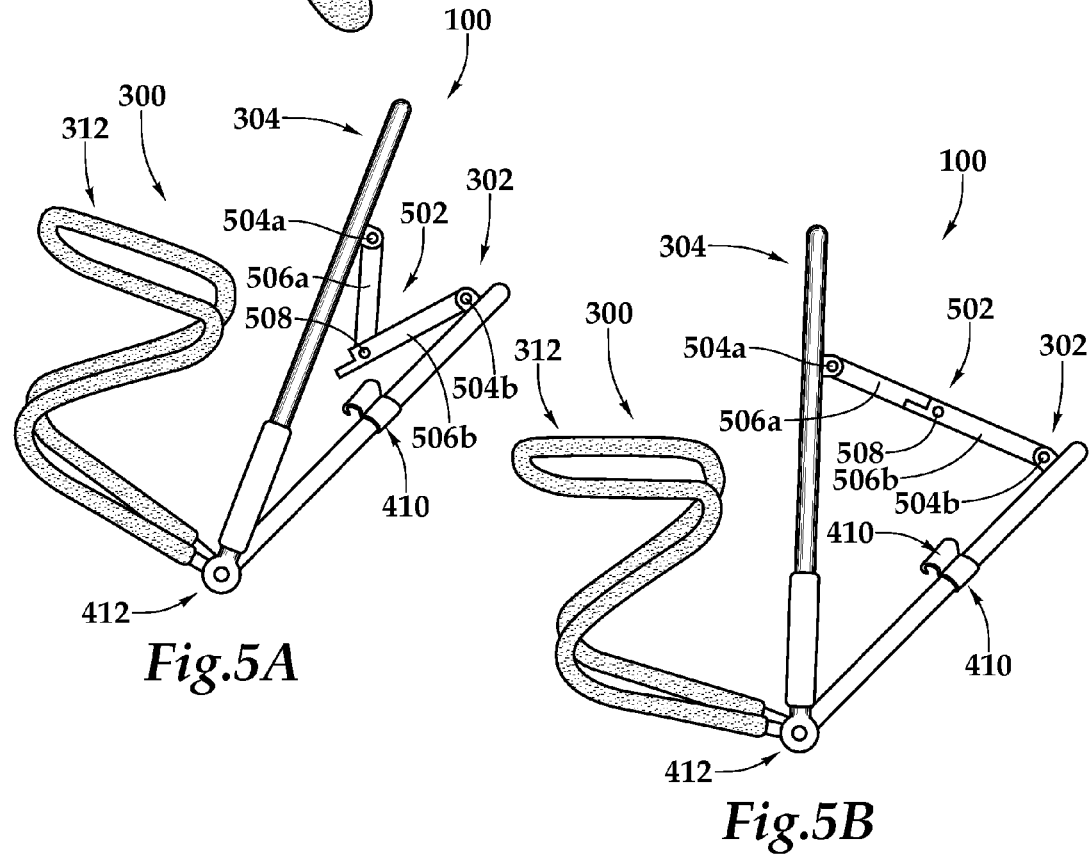

MULTI-POSITION BEVERAGE CONTAINER CARRIER FOR BICYCLES

TECHNICAL FIELD OF THE INVENTION

This invention relates, in general, to a beverage holder for bicycles and, in particular, to a multi-position beverage container carrier for bicycles.

BACKGROUND OF THE INVENTION

Without limiting the scope of the present invention, its background will be described in relation to a multi-position beverage container carrier for bicycles, as an example.

Water bottles and their holders are common accessories on today's bicycles. They are used routinely by riders to keep hydrated while riding. The main part of a holder is the resilient wire "cage" that hold the cylindrically shaped elastic or plastic bottles. Oftentimes, the wire cage is pre-shaped to snugly fit the elastic bottle and it may have portions that are slightly smaller in diameter than the elastic water bottle such that the holder has a bias against the elastic bottle to keep it in place during riding. A circumferential recess may also be formed in the elastic bottle mating with a rim portion of the wire cage for additional security.

The holders include mounting brackets that are bolted to threaded mounts that are located on either the seat tube, down tube, or both of a bicycle. The most common location for the mount is on the upper side of the down tube. In this position, the bottle is presented to the rider for easier access than in other locations, such as on the seat tube, where often other accessories are mounted, such as pumps, and the like. Since the seat tube is angled relative to horizontal, to prevent water bottles from spilling liquid while riding, they typically include a sealable spout or opening that may be closed when in the holder and quickly opened during riding for use by the rider.

Due to numerous factors, the popularity of bicycles is increasing dramatically. In addition to recreational and sporting uses, they are becoming a popular mode of transportation for daily commuters to work. With the increase in popularity of the bicycle as a standard mode of transportation and the increasing number and diversity of people riding them, the standard water bottle and its carrier may not fulfill all beverage carrying needs of these riders.

For example, people who used to walk or drive with a cup of their favorite beverage may decide that they wish to ride a bicycle instead. Many of these types of containers do not include full sealing lids or enclosures, thus even if a standard inclined water bottle holder were adaptable for use with these beverage containers, the results would be less than ideal as liquid would spill out due to the stored angle of the beverage container in the holder. Some methods are known for carrying these conventional containers that are not sealed like a standard water bottle.

In one such method, a cup holding apparatus includes a cub holding assembly that is designed to be securely mounted to the handlebars of a bicycle or motorcycle. This of course requires an additional assembly and mount in addition to the water bottle and mount located on the bicycle's down tube. Further, it clutters up the handlebar area with a mount and assembly.

In another method, a self-leveling beverage holder is mounted on a bicycle's top tube or handlebars and includes a slot for accepting a looped end of a wire basket for holding a beverage. The wire basket and bottle swing from side to side caused by the force of the bicycle movement. They may come in contact with a rider's legs during riding, which may not be a desirable situation. As with the previous method, this holder requires an additional mount and assembly.

Accordingly, a need has arisen for a beverage container carrier that fits the needs of today's bicyclists. One that is capable of carrying water bottles and different type and shapes of beverage containers.

SUMMARY OF THE INVENTION

The present invention disclosed herein is directed to a multi-position beverage container carrier for bicycles that provides the ability to carry many different beverage containers.

In one embodiment, the present invention is directed to a multi-position beverage container carrier including a mount adaptable for mounting on a down tube of bicycle, the mount having a hub disposed substantially near the lower end of the mount; and a carriage extending from the hub, wherein the carriage is movable from a first position substantially adjacent to the down tube to a second position located substantially vertical in a plane formed by the seat post and the down tube.

In one aspect, the hub has a rotational portion and a non-rotational portion, the carriage being disposed to the rotational portion and the mount being disposed to the non-rotational portion. Preferably, the hub provides rotational movement of the carriage through the plane formed by the down tube and the seat post between the first position and the second position. The multi-position beverage container carrier may further include a retaining mechanism disposed about one of the mount and the carriage for engaging the other of the mount and carriage to lock the carriage in the first position. In yet another aspect, the multi-position beverage container carrier may include a retractable member disposed between the mount and the carriage for supporting the carriage in the second position. Additionally, the carriage is adaptable to carrying a water bottle in the first position and beverage container in the second position.

In yet another embodiment, the present invention is directed to a multi-position beverage container carrier including a mount having an upper end and a lower end and adaptable for mounting on a down tube of a bicycle, the lower end including holes formed therethrough; a carriage having an upper end and a lower end, the lower end including holes formed therethrough; and a rod disposed through the holes of the lower end of the mount and the holes of lower end of the carriage for providing rotational movement of the carriage from a first position substantially adjacent to the down tube to a second position located substantially vertical in a plane formed by the seat post and the down tube.

In one aspect, the lower ends of the mount and carriage are flanged for forming the holes of the lower ends therethrough. Preferably, the multi-position beverage container carrier may further include a retaining mechanism disposed about one of the mount and the carriage for engaging the other of the mount and carriage to lock the carriage in the first position. Also preferably, the multi-position beverage container carrier may further include a retractable member disposed between the mount and the carriage for supporting the carriage in the second position.

In yet another aspect, the retractable member may include a locking mechanism for locking the carriage in the second position. Preferably, the carriage is adaptable to carrying a water bottle in the first position and beverage container in the second position.

In yet another embodiment, the present invention is directed to a multi-position beverage container carrier including a mount having an upper end and a lower end and adaptable for mounting on a down tube of a bicycle, the lower end including holes formed therethrough; a carriage having an upper end and a lower end, the lower end including holes formed therethrough; a rod disposed through the holes of the lower end of the mount and the holes of lower end of the carriage for providing rotational movement of the carriage from a first position substantially adjacent to the down tube to a second position located substantially vertical in a plane formed by the seat post and the down tube; and a retractable member disposed between the mount and the carriage for supporting the carriage in the second position.

Preferably, the retractable member includes a first arm disposed to the mount and a second anti disposed to the carriage, the first arm and second arm are rotatably joined together at their other end to enable the first and second arm to rotate adjacent to each other for moving the carriage from the second position to the first position. Also preferably, one or more of the first arm and the second arm include a slot, groove, detent, recesses rib, and protrusion for locking the first arm and the second arm. In addition, the retractable member may further include a locking mechanism for locking the carriage in the second position.

Preferably, the retractable member further includes a slidable locking mechanism locking the two arms in a fully extended position. Also, the multi-position beverage container carrier may further include a retaining mechanism disposed about one of the mount and the carriage for engaging the other of the mount and carriage to lock the carriage in the first position. Further, the lower ends of the mount and carriage are flanged for forming the holes of the lower ends therethrough. Preferably, the carriage is adaptable to carrying a water bottle in the first position and a beverage container in the second position.

BRIEF DESCRIPTION OF THE DRAWINGS

For amore complete understanding of the features and advantages of the present invention, reference is now made to the detailed description of the invention along with the accompanying figures in which corresponding numerals in the different figures refer to corresponding parts and in which:

FIG. 3 is a perspective view of a multi position beverage container carrier in a retracted position according to an embodiment of the present invention;

FIG. 4 is a perspective view, partially cut away, of a mounting bracket of the multi-position beverage container carrier according to an embodiment of the present invention;

FIG. 5A is a perspective view of the multi-position beverage container carrier of FIG. 3 in partially retracted position;

FIG. 5B is a perspective view of the multi-position beverage container carrier of FIG. 3 in a fully extended position;

DETAILED DESCRIPTION OF THE INVENTION

While the making and using of various embodiments of the present invention are discussed in detail below, it should be appreciated that present invention provides many applicable inventive concepts which can be embodied in a wide variety of specific contexts. The specific embodiments discussed herein are merely illustrative of specific ways to make and use the invention, and do not delimit the scope of the present invention.

In the following description of the representative embodiments of the invention, directional terms, such as "above", "below", "upper", "lower", etc., are used for convenience in referring to the accompanying drawings. In general, "above", "upper", "upward", and similar terms refer to a direction generally vertically upward from a particular element of bicycle, mount, or ground, and "below", "lower", "downward" and similar terms refer to a direction generally vertically downward from a particular element of a bicycle or mount. Additionally, the term "vertical" and similar terms refer to a direction substantially perpendicular with the surface of the earth or some surf ace thereon, and the term "horizontal" and similar terms refer to a direction substantially parallel with the surface of the earth or some surface thereon.

Figure 1:
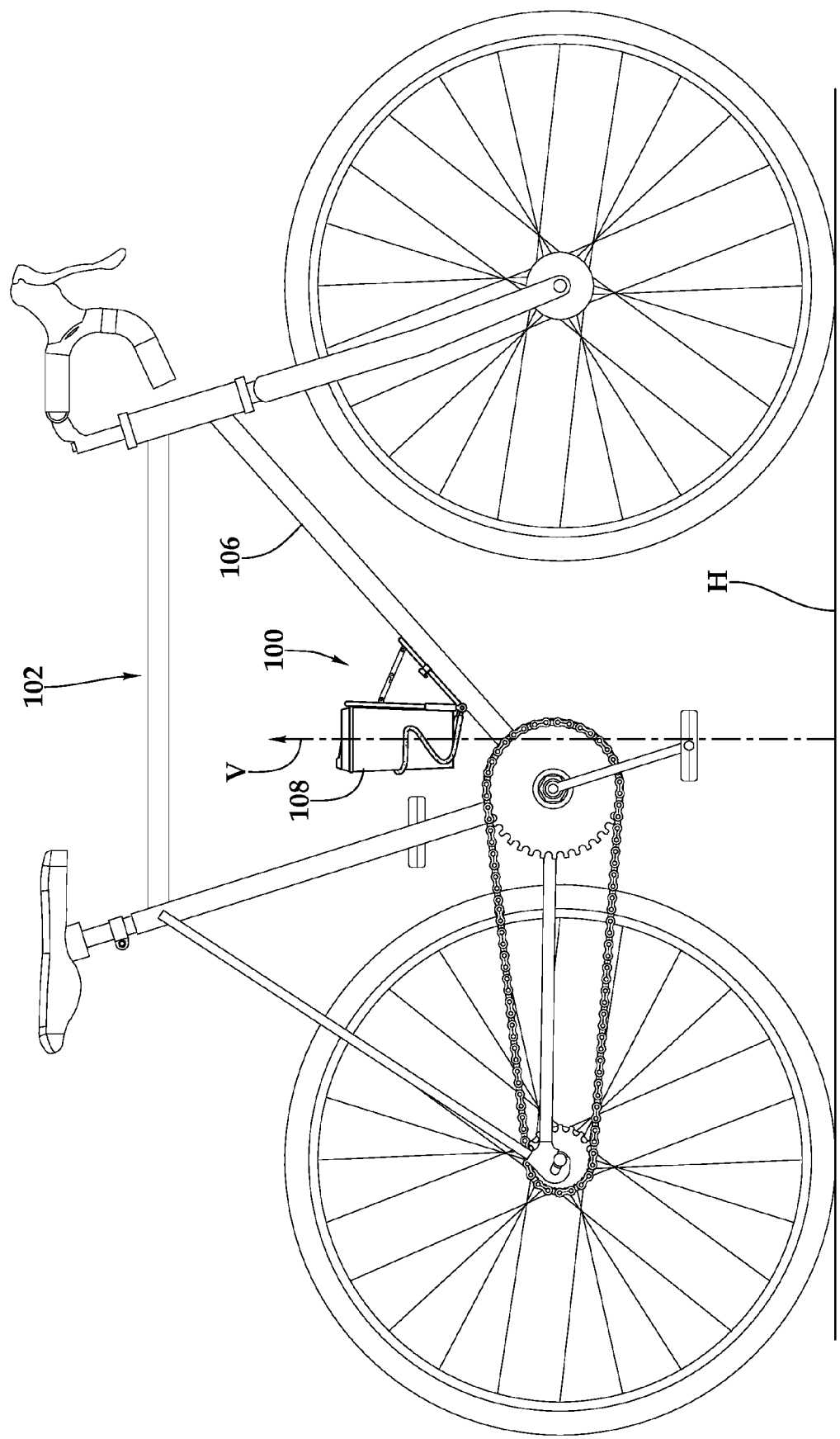
FIG. 1 is a side elevation view of a multi-position beverage container carrier in a vertical position attached to a bicycle according to an embodiment of the present invention.
Figure 2:
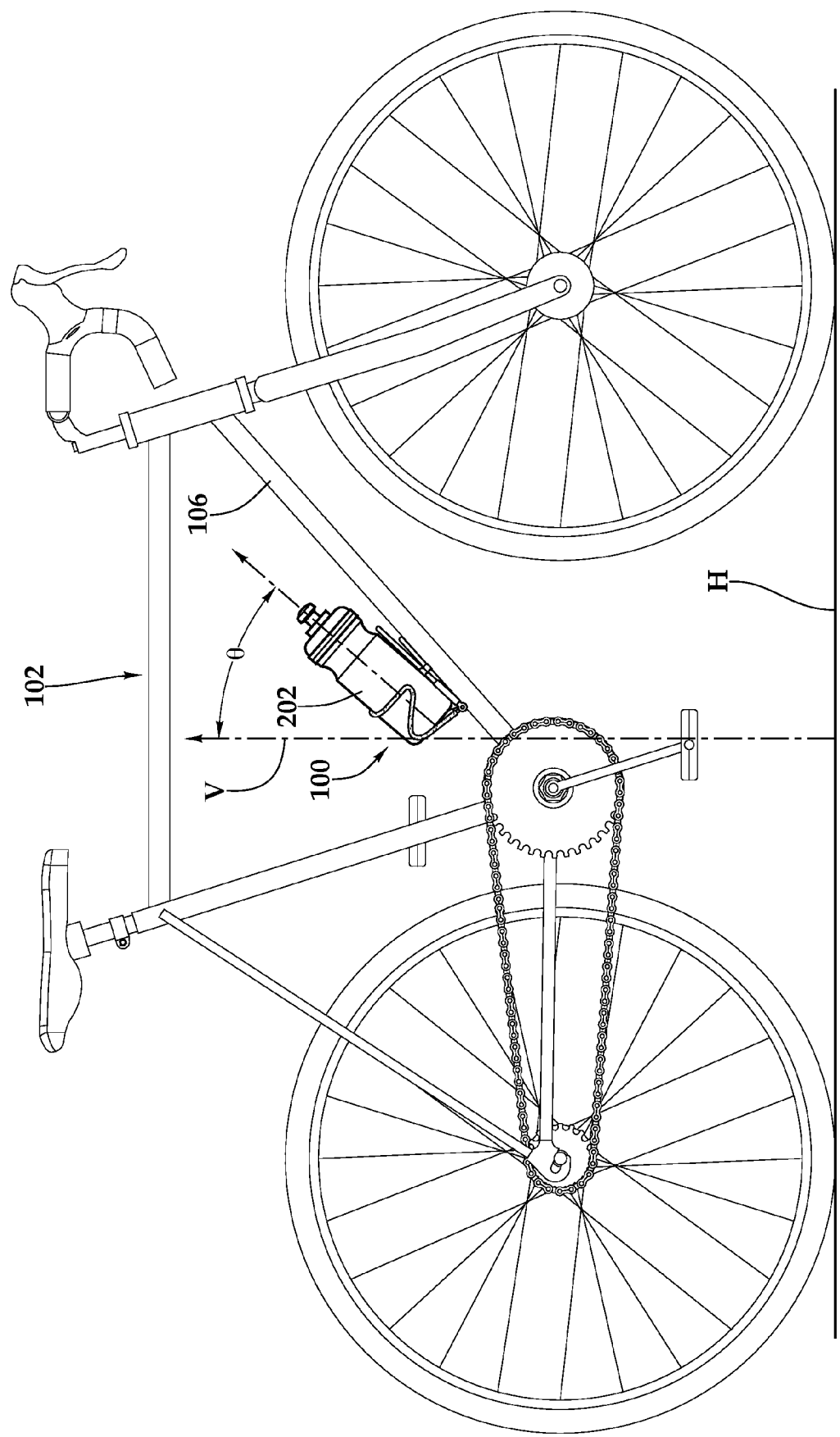
FIG. 2 is a side elevation view of the multi-position beverage container carrier of FIG. 1 in an inclined second position.

Referring initially to FIGS. 1-2, a multi-position beverage container carrier ("multi-position carrier") attached to a bicycle is schematically illustrated and generally designated 100. The bicycle 102 shown includes a typical triangular frame made of a seat tube that accepts the seat post of a seat and an upper top tube that may be substantially horizontal or inclined depending on the design of the bicycle. The third member of the general triangular frame is a down tube 106 that typically connects with the seat post at the bottom bracket and it connects with the top tube at the head tube. Generally, 106 is a tubular member that is inclined or angled from a horizontal axis ("H") and vertical axis ("V") due to its arrangement in the triangular bicycle frame.

As shown in FIG. 1, multi-position carrier 100 provides a retractable carriage that holds a common beverage container 108 in a substantially vertical position. Some exemplary beverage container 108 include disposable coffee cups, reusable coffee cups, disposable hot beverage cups, disposable cold beverage cups portable beverage cups, recyclable beverage cups, fountain drink cups, and the like. Beverage container 108 may or may not include tops. The longitudinal axis of the carriage is substantially vertical for holding these types of containers when in the fully extended position as will be more fully discussed below. In such a position, common beverage containers may be carried on bicycle 102 such that they may not require a sealed top to prevent spilling. Multi-position carrier 100 is shown in a fully extended position in FIG. 1.

With reference to FIG. 2, multi-position carrier 100 is shown in the fully retracted position for carrying a standard or conventional type water bottles ("water bottle") 202. Multi-position carrier 100 is movable by a user through an angle θ from the fully extended position as shown in FIG. 1 to the fully retracted position of FIG. 2. The longitudinal axis of the carriage of multi-position carrier 100 is substantially parallel to down tube 106 in the fully retracted position and has an angle θ relative to down tube 106 when in the fully extended position. Multi-position carrier 100 retracts and extends substantially along the axis or plane formed between down tube 106 and the seat tube supporting the seat post.

Referring now to FIG. 3, multi-position carrier 100 includes a holder or carriage 300 for carrying, holding, or containing beverage container 108 and water bottle 202. Multi-position carrier 100 further includes a mount 302 for preferably mounting multi-position carrier 100 to the upper side of down tube 106 of bicycle 102. Carriage 300 includes a rear carriage member 304 that is retained to mount 302 by retaining mechanisms 410a, 410b (collectively retaining mechanisms 410) (FIG. 4).

Rear carriage member 304 is formed by frame members 306a, 306b, and 306c (collectively frame members 306). In one aspect, frame members 306a, 306c extend substantially parallel to one another and are joined at the top by frame member 306b. In another aspect, frame members 306 are a unitary piece of material, such as a tubular member. In another aspect, frame members 306 may to separate or individual pieces of material and joined together by methods commonly known to those skilled in the art. Additionally, frame members 306a, 306c may be joined or supported by a cross member 308 for additional structural rigidity. Cross member 308 may be a tubular member that is disposed between frame members 306a, 306c nearer to where they join frame member 306b for example. Other cross members as commonly known to those skilled in the art may be used in place of cross member 308. In another embodiment, multi-position carrier 100 may not include cross member 308. In one embodiment, the lower ends of frame members 306a, 306b extend downward and are joined in a rotational member or hub 310 as further discussed below.

Carriage 300 further includes a front carriage member 304 that is formed by frame members 314a, 314b, 314c, 314d, 314e (collectively frame members 314). In one aspect, frame members 314a, 314b may extend divergently from hub 310 to be joined with frame members 314c, 314d, which may extend substantially upwardly to be joined by frame member 314e. On one embodiment, frame member 314e may be rounded, curved, shaped, and/or semicircular in shape for engaging with the outer surface of beverage container 108 and water bottle 202.

With particular attention to the shape of carriage 300, it is important that rear carriage member 304 and frame members 314 together form a carriage that is acceptable to carrying both beverage container 108 and water bottle 202. As these two types of containers may have slightly different outer diameters or shaped surfaces. Additionally, the location of frame member 314e may be slightly lower than in conventional bicycle water bottle holders, to accommodate less tall beverage container 108.

As discussed above, in one aspect, frame members 314 are a unitary piece of material, such as a tubular member. In another aspect, frame members 314 may separate or individual pieces of material and joined together by methods commonly known to those skilled in the art.

Frame members 306, 314 may be comprised of a material that is convenient and inexpensive to form such members. Additionally, they are comprised of a material sufficiently rigid to hold beverage container 108 and water bottle 202 when full with liquid. They may be tubular member, non-tubular members, and the like. They may be farmed from thick sections of wire, for example. Furthermore, rear carriage member 304 and front carriage member 312 are made of materials that may have some resiliency characteristic or properties such that they are capable of being slightly forced apart by a user during the insertion of beverage container 108 or water bottle 202, but then return to substantially their original position to hold beverage container 108 and water bottle 202 in place. Some exemplary materials may include aluminum, steel, plastic, alloys, and the like.

Additionally, as shown, any of frame members 306, 314 may be partially or fully wrapped or enclosed with a material for improving the holding, cushioning, and/or gripping of beverage container 108 and water bottle water bottle 202 in carriage 300. Some exemplary materials include rubber, foam, sponge, rubber sponge, plastic, silicone, nylon, and the like.

Referring now to FIG. 4, mount 302 may include a plate 402 that includes one or more mounting holes 406a, 406b (collectively mounting holes 406) therethrough for accepting fasteners, such as screws or bolts, for engaging with threaded connectors welded or part of the upper side of down tube 106 of bicycle 102. In general, mounting holes 406 are spaced apart by a standard distance that coincides with the threaded connectors on down tube 106. Additionally, plate 402 may be bordered by one or more frame members 404a, 404b, 404c (collectively frame members 404). As shown, plate 402 extends between frame members 404a, 404b. In another embodiment, plate 402 completely is joined by frame members 404. In yet another embodiment, plate 402 may extend downward and join hub 310. Plate 402 may further include a slot 408 for decreasing the amount of mass or weight of plate 402 yet while still retaining its rigidity.

Frame members 404a, 404b extend substantially upward from hub 310 substantially parallel to corresponding frame members 306a, 306c. Frame member 404c may be curved for joining the distal ends of frame members 404a, 404b. Frame members 404 may be shaped, formed, and made, of materials as discussed above relative to frame members 306, 314.

As shown, a portion of retaining mechanisms 410 are disposed substantially around their respective frame members 404a, 404b. Retaining mechanisms 410 may include engaging portions that extend and curve inwardly for engaging with frame members 306a, 306c in a biased engagement as best illustrated in FIG. 3. Generally, the engaging portions of retaining mechanisms 410 are of a inner diameter or curvature to snugly fit the outer diameter of frame members 306a, 306c. Retaining mechanisms 410 may be made of a resilient material, such as plastic and the like. Additionally, hub 310 may be substantially adjacent to ends 412 for facilitating rotational movement of carriage 300 relative to mount 302 as discussed further below. In still yet another embodiment, retaining mechanisms 410 may be disposed about frame members 306 for engaging the engaging portion with mount 302.

Turning now to FIGS. 5A-5B, one embodiment of a retractable member is depicted and generally designated 502. Retractable member 502 may be disposed between mount 302 and rear carriage member 304 for supporting carriage 300 in the fully extended position as shown in FIGS. 1 and 5B. FIG. 5B shows retractable member 502 in partially extended or retracted position. Retractable member 502 may include a mount 504a that is disposed on rear carriage member 304 and a mount 504b that is disposed on mount 302. Mounts 504a, 504b may be collectively known as mounts 504. In one embodiment, mounts 504a, 504b may be incorporated, formed, or machined as part of rear carriage member 304 and mount 302, respectively. In another embodiment, mounts 504a, 504b may be individual parts that are disposed about or slidable over frame members 306 and frame members 404. In yet another embodiment, mounts 504a, 504b may be disposed on plate 402 and cross member 308.

Retractable member 502 further includes arms 506a, 506b (collectively arms 506) that are engaged at one end with mounts 504 and are engaged at the other end with each other via a pivotable junction, rotatable junction, or rotatable connection 508. When retractable member 502 is in the fully extended position, arms 506 are substantially fully extended positioning and supporting carriage 300 in the fully extended position as shown in FIGS. 1 and 5B.

As shown in FIGS. 5A-5B, the proximal ends of arms 506 may include slots, grooves, detents, recesses ribs, protrusions, and the like for engaging each other is locking manner to prevent, premature retraction of retractable member 502 when it is in the fully extended position. The features may be shaped or formed in both or one of arms 506.

Figure 9:
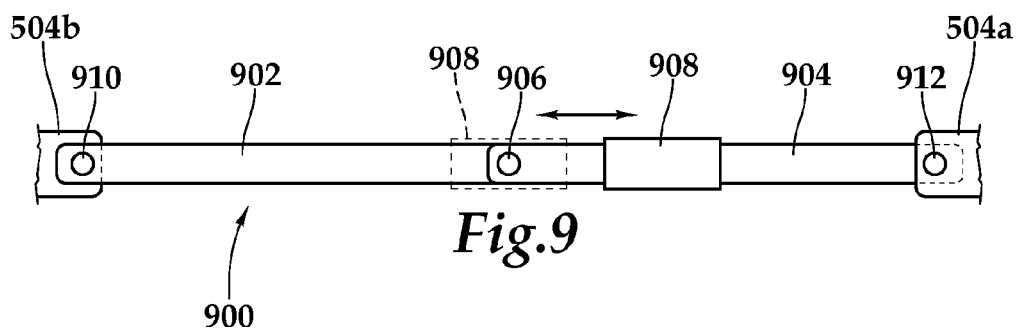
FIG. 9 is a side view of a retracting mechanism in a fully extended position of a multi-position beverage container carrier according to an embodiment of the present invention.
Figure 10:
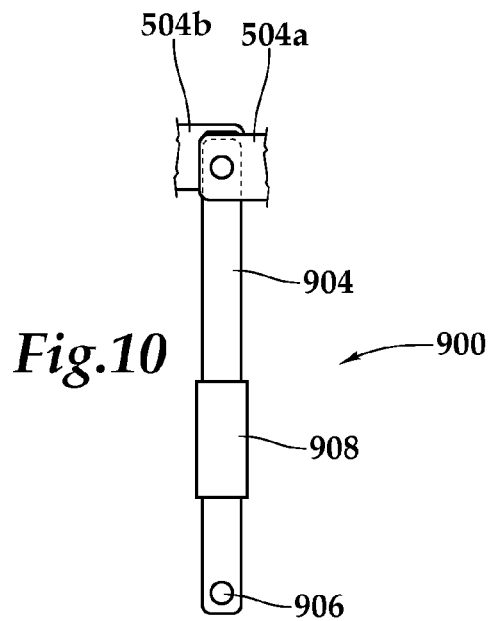
FIG. 10 is a side view of the retracting mechanism of FIG. 9 shown in a fully retracted position.

With reference now to FIGS. 9-10, another embodiment of a retractable member is depicted and generally designated 900. Retractable member 900 includes arms 902, 904 that are engaged with mounts 504b, 504a, respectively. The proximal ends of arms 902, 904 are joined together via a pivotable junction, rotatable junction, or rotatable connection 905. In addition, retractable member 900 may include a locking mechanism 908, such as a slidable lock, that is disposed about arms 902, 904 for locking arms 902, 904 in a fully extended position as shown in FIG. 9. Similar to retractable member 502, arms 902, 904 may be overlapped when in the fully retracted position as shown in FIG. 10.

Arms 506, 902, 904 may be joined with mounts 504 in a pivotable junction, rotatable junction, or rotatable connection. Corresponding holes may be formed in the ends of arms 506, 902, 904 and mounts 504 for accepting a rivet) rod, and the like to facilitate rotational movement of arms 506, 902, 904 relative to mounts 504 as shown in the figures. Other such connections as commonly known to those skilled in the art may be used in addition to or in place of those described herein.

Additionally, although several embodiments of retractable member is shown and described herein, the present multi-position carrier 100 may include other retractable members in addition to or in place of those described herein. For example, retractable member may be a resilient flat piece of flexible metal that is sufficiently bendable to be folded in half while in the fully retracted position, while sufficiently rigid enough to support carriage 300 in the fully extended position. In yet another embodiment, a hydraulic or pneumatic cylinder and piston may be employed between mount 302 and carriage 300.

Figure 6:
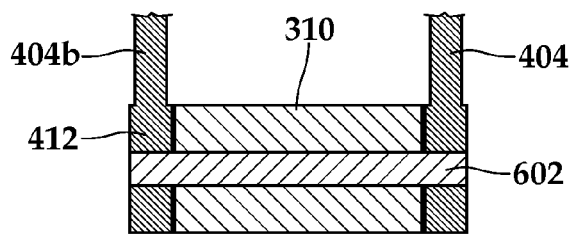
FIG. 6 is a cross sectional view of a carriage hub of a multi-Position beverage container carrier according to an embodiment of the present invention.
Figure 7:
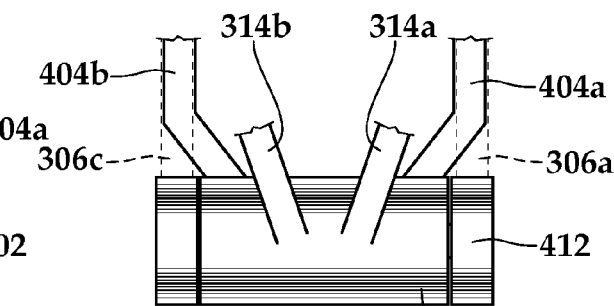
FIG. 7 is a partial front view of a carriage hub multi-position beverage container carrier according to an embodiment of the present invention.

Referring now to FIGS. 6-7, one embodiment of a hub 310 is shown. Hub 310 may include a substantially cylindrical slot through its longitudinal axis for accepting an axle or rod 602 to provide rotational movement of hub 310 relative to ends 412 of frame members 404a, 404b. In one embodiment, hub 310 may rotate about 602 relative to rod 412 to provide the necessary movement of carriage 300 relative to mount 302.

Figure 8:
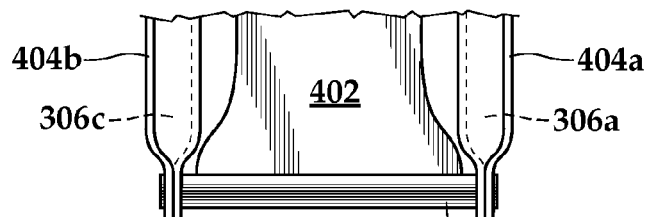
FIG. 8 is a partial front view of a carriage hub of a multi-position beverage container carrier according to another embodiment of the present invention.

Referring to FIG. 8, another embodiment of a hub assembly is shown. In this embodiment, the proximal ends of frame members 404a, 404b, 306a, 306c are pressed or flanged to accommodate the rotational movement of carriage 300 relative to mount 302. These flanged ends may have a hole formed therethrough for accepting an axle or rod 802 to provide the movement of carriage 300 relative to mount 302. Other such hub assemblies as commonly known to those skilled in the art may be used in addition to or in place of those described herein.

While this invention has been described with reference to illustrative embodiments, this description is not intended to be construed in a limiting sense. Although it is acknowledged that the embodiments of the present invention have been described relative to a conventional triangular bicycle frame, it is further acknowledged that the embodiments of the present invention may be used with non-conventional frames for the same purposes as described herein relative to an inclined frame member of a bicycle. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A multi-position beverage container carrier comprising:
   a mount adaptable for mounting on a down tube of a bicycle, the mount having a hub disposed substantially near the lower end of the mount; and
   a carriage extending from the hub, the carriage including front and rear carriage members, the carriage pivotably movable about the hub and defining a cavity with an upper open portion between the front and rear carriage members for accepting and releasably holding a beverage container, wherein the carriage is pivotably movable from a first position substantially adjacent to the down tube to a second position located substantially vertical in a plane formed by a seat post and the down tube, and wherein the first position and second position are capable of releasably holding the beverage container.

2. The multi-position beverage container carrier as recited in claim 1, wherein the hub has a rotational portion and a non-rotational portion, the carriage being attached to the rotational portion and the mount being attached to the non-rotational portion.

3. The multi-position beverage container carrier as recited in claim 1, wherein the hub provides rotational movement of the carriage through the plane formed by the down tube and the seat post between the first position and the second position.

4. The multi-position beverage container carrier as recited in claim 1, further comprising:
   a retaining mechanism disposed about one of the mount and the carriage for engaging the other of the mount and carriage to lock the carriage in the first position.

5. The multi-position beverage container carrier as recited in claim 1, further comprising:
   a retractable member disposed between the mount and the carriage for supporting the carriage in the second position.

6. The multi-position beverage container carrier as recited in claim 1, wherein the carriage is adaptable to carrying a water bottle in the first position and a beverage container in the second position.

7. A multi-position beverage container carrier comprising:
   a mount having an upper end and a lower end and adaptable for mounting on a down tube of a bicycle, the lower end including holes formed therethrough;
   a carriage including front and rear carriage members, an upper open portion between the front and rear carriage members for accepting and releasably holding a beverage container, and a lower end, the lower end including holes formed therethrough; and
   a rod disposed through the holes of the lower end of the mount and the holes of lower end of the carriage for providing rotational movement of the carriage from a first position substantially adjacent to the down tube to a second position located substantially vertical in a plane formed by a seat post and the down tube, wherein the first position and second position are capable of releasably holding the beverage container.

8. The multi-position beverage container carrier as recited in claim 7, wherein lower ends of the mount and carriage are flanged for forming the holes of the lower ends therethrough.

9. The multi-position beverage container carrier as recited in claim 7, further comprising:
a retaining mechanism disposed about one of the mount and the carriage for engaging the other of the mount and carriage to lock the carriage in the first position.

10. The multi-position beverage container carrier as recited in claim 7, further comprising:
a retractable member disposed between the mount and the carriage for supporting the carriage in the second position.

11. The multi-position beverage container carrier as recited in claim 10, wherein the retractable member further comprises:
a locking mechanism for locking the carriage in the second position.

12. The multi-position beverage container carrier as recited in claim 7, wherein the carriage is adaptable to carrying a water bottle in the first position and a beverage container in the second position.

13. A multi-position beverage container carrier comprising:
a mount having an upper end and a lower end and adaptable for mounting on a down tube of a bicycle, the lower end including holes formed therethrough;
a carriage including front and rear carriage members, an upper open portion between the front and rear carriage members, and a lower end, the lower end including holes formed therethrough and the upper open portion terminating substantially upwardly in an opening for accepting and releasably holding a beverage container;
a rod disposed through the holes of the lower end of the mount and the holes of lower end of the carriage for providing rotational movement of the carriage from a first position substantially adjacent to the down tube to a second position located substantially vertical in a plane formed by a seat post and the down tube; and
a retractable member disposed between the mount and the carriage for supporting the carriage in the second position, wherein the first position and second position are capable of releasably holding the beverage container.

14. The multi-position beverage container carrier as recited in claim 13, wherein the retractable member includes a first arm disposed to the mount and a second arm disposed to the carriage, the first arm and second arm are rotatably joined together at their other end to enable the first and second arm to rotate adjacent to each other for moving the carriage from the second position to the first position.

15. The multi-position beverage container carrier as recited in claim 14, wherein one or more of the first arm and the second arm include one or more of a slot, groove, detent, recesses rib, and protrusion for locking the first arm and the second arm.

16. The multi-position beverage container carrier as recited in claim 13, wherein the retractable member further comprises:
a locking mechanism for locking the carriage in the second position.

17. The multi-position beverage container carrier as recited in claim 14, wherein the retractable member further comprises:
a slidable locking mechanism for locking the two arms in a fully extended position.

18. The multi-position beverage container carrier as recited in claim 13, further comprising:
a retaining mechanism disposed about one of the mount and the carriage for engaging the other of the mount and carriage to lock the carriage in the first position.

19. The multi-position beverage container carrier as recited in claim 13, wherein lower ends of the mount and carriage are flanged for forming the holes of the lower ends therethrough.

20. The multi-position beverage container carrier as recited in claim 13, wherein the carriage is adaptable to carrying a water bottle in the first position and a beverage container in the second position.

* * * * *